US011323841B2

(12) United States Patent
Qu et al.

(10) Patent No.: US 11,323,841 B2
(45) Date of Patent: May 3, 2022

(54) METHODS AND APPARATUSES FOR EXPOSURE OF PRESENCE REPORTING AREA FUNCTIONALITY

(71) Applicant: Telefonaktiebolaget LM Ericsson (publ), Stockholm (SE)

(72) Inventors: Zhiwei Qu, Shanghai (CN); Jinyin Zhu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/962,702

(22) PCT Filed: Jan. 31, 2019

(86) PCT No.: PCT/CN2019/074218
§ 371 (c)(1),
(2) Date: Jul. 16, 2020

(87) PCT Pub. No.: WO2019/154278
PCT Pub. Date: Aug. 15, 2019

(65) Prior Publication Data
US 2020/0367014 A1    Nov. 19, 2020

(30) Foreign Application Priority Data
Feb. 7, 2018    (WO) ............... PCT/CN2018/075618

(51) Int. Cl.
*H04W 4/021* (2018.01)
*H04W 8/22* (2009.01)
*H04M 15/00* (2006.01)

(52) U.S. Cl.
CPC ........... *H04W 4/021* (2013.01); *H04M 15/66* (2013.01); *H04W 8/22* (2013.01)

(58) Field of Classification Search
CPC ......... H04W 4/02; H04W 4/021; H04W 4/24; H04W 4/50; H04W 88/08–188
See application file for complete search history.

(56) References Cited

U.S. PATENT DOCUMENTS

2011/0087431 A1    4/2011   Gupta et al.
2015/0365789 A1   12/2015   Salot et al.
(Continued)

FOREIGN PATENT DOCUMENTS

CN    101796804 A    8/2010
CN    103902636 A    7/2014
(Continued)

OTHER PUBLICATIONS

PCT International Search Report issued for International application No. PCT/CN2019/074218—dated Apr. 18, 2019.
(Continued)

*Primary Examiner* — San Htun
(74) *Attorney, Agent, or Firm* — Baker Botts, LLP

(57) ABSTRACT

Methods and apparatuses for exposure of presence reporting area (PRA) functionality are disclosed for a wireless communication system. According to an embodiment, a service capability exposure function (SCEF) entity receives, from a requesting server, a first request for initiating PRA functionality for at least one user equipment (UE). The PRA functionality is used to monitor whether the at least one UE is located in at least one area of interest. The SCEF entity obtains at least one monitored result for the at least one UE from a mobility management node via a home subscriber server (HSS) or via a policy and charging rules function (PCRF) entity. The SCEF entity sends the at least one monitored result to the requesting server.

14 Claims, 10 Drawing Sheets

(56) References Cited

U.S. PATENT DOCUMENTS

| | | | |
|---|---|---|---|
| 2016/0277243 A1* | 9/2016 | Kim | H04W 24/08 |
| 2017/0118667 A1 | 4/2017 | Mattsson et al. | |
| 2017/0265245 A1* | 9/2017 | Yang | H04W 8/24 |
| 2019/0110241 A1* | 4/2019 | Jain | H04W 24/02 |

FOREIGN PATENT DOCUMENTS

| | | |
|---|---|---|
| CN | 104170482 A | 11/2014 |
| CN | 106982473 A | 7/2017 |
| CN | 107211256 A | 9/2017 |
| RU | 2014152872 A | 7/2016 |

OTHER PUBLICATIONS

PCT Written Opinion of the International Searching Authority issued for International application No. PCT/CN2019/074218—dated Apr. 18, 2019.

Russian Office Action issued for Application No. 2020129102/07(052057)—dated Dec. 30, 2020.

Routine-Based Network Deployment for Data Offloading in Metropolitan Area by Eduardo Mucilli, Rezende Oliveira and Aline Carneiro Viana—Apr. 2014.

3GPP TR 23.789 v13.0.0; Technical Report; 3rd Generation Partnership Project; Technical Specification Group Services and System Aspects; Monitoring enhancements (Release 13)—Mar. 2015.

3GPP TS 23.682 v15.3.0; Technical Specification; 3rd Generation Partnership Project; Technical Specification Group Services and System Aspects; Architecture enhancements to facilitate communications with packet data networks and applications (Release 15)—Dec. 2017.

SA WG2 Meeting #105; Sapporo, Japan Source: Ericsson, Alcatel-Lucent; Title: Event notifications using PCC solutions for Monte (S2-143070)—Oct. 13-17, 2014.

3GPP TS SA Meeting #66; Maui, Hawaii, U.S.A.; Title: TR 23.789: Monitoring Enhancements (MONTE); Source: Sa WG2 (TD SP-140701)—Dec. 10-12, 2014.

3GPP TS 29.214 v15.2.0; Technical Specification; 3rd Generation Partnership Project; Technical Specification Group Core Network and Terminals; Policy and Charging Control over Rx reference point (Release 15)—Dec. 2017.

3GPP TS 23.789 v1.0.0; Technical Specification; 3rd Generation Partnership Project; Technical Specification Group Services and System Aspects; Monitoring Enhancements (Release 13)—Dec. 2014.

Office Action issued by the CNIPA for Chinese Patent Application No. 201980011989.7—dated Nov. 29, 2021.

\* cited by examiner

METHODS AND APPARATUSES FOR EXPOSURE OF PRESENCE REPORTING AREA FUNCTIONALITY

PRIORITY

This nonprovisional application is a U.S. National Stage Filing under 35 U.S.C. § 371 of International Patent Application Serial No. PCT/CN2019/074218 filed Jan. 31, 2019 and entitled "METHODS AND APPARATUSES FOR EXPOSURE OF PRESENCE REPORTING AREA FUNCTIONALITY" which claims priority to International Patent Application Serial No. PCT/CN2018/075618 filed Feb. 7, 2018 both of which are hereby incorporated by reference in their entirety.

TECHNICAL FIELD

Embodiments of the disclosure generally relate to wireless communication, and, more particularly, to methods and apparatuses for exposure of presence reporting area (PRA) functionality.

BACKGROUND

This section introduces aspects that may facilitate better understanding of the present disclosure. Accordingly, the statements of this section are to be read in this light and are not to be understood as admissions about what is in the prior art or what is not in the prior art.

Service capability exposure function (SCEF) is a node to expose services and capabilities of 3rd generation partnership project (3GPP) network to an external application service center. The SCEF is introduced in 3GPP release 13 (R13) technical specification (TS) 23.682. According to the latest version of 3GPP TS 23.682, eight exposure events have been defined.

The first exposure event is the number of user equipments (UEs) present in a geographic area, which can be detected directly via mobility management entity (MME). The second exposure event is loss of connectivity, which can be detected via home subscriber server (HSS). The third exposure event is UE reachability, which can be detected via HSS. The fourth exposure event is location reporting, which can be obtained via HSS or policy and charging rules function (PCRF). The fifth exposure event is the change of international mobile subscriber identification number (IMSI)-international mobile equipment identity (IMEI) software version (SV) association, which can be detected via HSS. The sixth exposure event is roaming status, which can be detected via HSS. The seventh exposure event is communication failure, which can be detected via HSS or PCRF. The eighth exposure event is availability after downlink data notification (DDN) failure, which can be detected via HSS.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to improve the services/capabilities exposed by SCEF.

According to a first aspect of the disclosure, there is provided a method implemented at an SCEF entity. The method comprises receiving, from a requesting server, a first request for initiating PRA functionality for at least one UE. The PRA functionality is used to monitor whether the at least one UE is located in at least one area of interest. The method further comprises obtaining at least one monitored result for the at least one UE from a mobility management node via an HSS or via a PCRF entity. The method further comprises sending the at least one monitored result to the requesting server.

In an embodiment of the disclosure, the method further comprises determining via which one of the HSS and the PCRF entity the at least one monitored result is to be obtained, according to an operator policy.

In an embodiment of the disclosure, obtaining the at least one monitored result via the HSS comprises sending to the HSS a second request for initiating PRA functionality for the at least one UE. Obtaining the at least one monitored result via the HSS further comprises receiving a first monitored result from the HSS.

In an embodiment of the disclosure, obtaining the at least one monitored result via the HSS further comprises receiving an updated monitored result from the mobility management node when the presence status of the at least one UE relative to the at least one area of interest has changed.

In an embodiment of the disclosure, the first request is a Monitoring Request message having Monitoring Type set to PRA and PRA Info set to first information about the at least one area of interest. The second request is a Monitoring Request message having Monitoring Type set to PRA and PRA Info set to second information about the at least one area of interest. The first monitored result is received and sent in a Monitoring Response message having PRA Status set to the first monitored result. The updated monitored result is received and sent in a Monitoring Indication message having PRA Status set to the updated monitored result.

In an embodiment of the disclosure, the first information indicates the at least one area of interest in a same or different manner than the second information.

In an embodiment of the disclosure, obtaining the at least one monitored result via the PCRF entity comprises sending to the PCRF entity a third request for initiating PRA functionality for the at least one UE. Obtaining the at least one monitored result via the PCRF entity further comprises receiving a first monitored result from the PCRF entity.

In an embodiment of the disclosure, obtaining the at least one monitored result via the PCRF entity further comprises receiving an updated monitored result from the PCRF entity when the presence status of the at least one UE relative to the at least one area of interest has changed.

In an embodiment of the disclosure, an amount of the at least one UE is one. The first request is a Monitoring Request message having Monitoring Type set to PRA and PRA Info set to first information about the at least one area of interest. The third request is an Authentication Authorization Request (AAR) message with Specific Action set to PRA and PRA Info set to third information about the at least one area of interest. The first monitored result is received in a Re-Authorization Request (RAR) message with Specific Action set to PRA and PRA Status set to the first monitored result, and sent in a Monitoring Indication message having PRA Status set to the first monitored result. The updated monitored result is received in an RAR message with Specific Action set to PRA and PRA Status set to the updated monitored result, and sent in a Monitoring Indication message having PRA Status set to the updated monitored result.

In an embodiment of the disclosure, an amount of the at least one UE is more than one. The first request is a Monitoring Request message having Monitoring Type set to PRA, PRA Info set to first information about the at least one area of interest, as well as External Group Identifier and Group Reporting Guard Time for the more than one UEs. The third request is a Monitoring Request message having Monitoring Type set to PRA, PRA Info set to third information about the at least one area of interest, as well as External Group Identifier for the more than one UEs. The first monitored result is received and sent in a Monitoring Indication message having PRA Status set to the first monitored result. The updated monitored result is received and sent in a Monitoring Indication message having PRA Status set to the updated monitored result.

In an embodiment of the disclosure, the first information indicates the at least one area of interest in a same or different manner than the third information.

According to a second aspect of the disclosure, there is provided a method implemented at a requesting server. The method comprises sending to an SCEF entity a first request for initiating PRA functionality for at least one UE. The PRA functionality is used to monitor whether the at least one UE is located in at least one area of interest. The method further comprises receiving at least one monitored result for the at least one UE from the SCEF entity.

In an embodiment of the disclosure, receiving the at least one monitored result comprises receiving a first monitored result from the SCEF entity in response to the sending of the first request.

In an embodiment of the disclosure, receiving the at least one monitored result further comprises receiving an updated monitored result from the SCEF entity when the presence status of the at least one UE relative to the at least one area of interest has changed.

In an embodiment of the disclosure, the first request is a Monitoring Request message having Monitoring Type set to PRA and PRA Info set to first information about the at least one area of interest. The first monitored result is received in a Monitoring Response or Monitoring Indication message having PRA Status set to the first monitored result. The updated monitored result is received in a Monitoring Indication message having PRA Status set to the updated monitored result.

According to a third aspect of the disclosure, there is provided a method implemented at an HSS. The method comprises receiving, from an SCEF entity, a second request for initiating PRA functionality for at least one UE. The PRA functionality is used to monitor whether the at least one UE is located in at least one area of interest. The method further comprises obtaining at least one monitored result for the at least one UE from a mobility management node. The method further comprises sending the at least one monitored result to the SCEF entity.

In an embodiment of the disclosure, obtaining the at least one monitored result comprises sending to the mobility management node a fourth request for initiating PRA functionality for the at least one UE. Obtaining the at least one monitored result further comprises receiving a first monitored result from the mobility management node.

In an embodiment of the disclosure, the second request is a Monitoring Request message having Monitoring Type set to PRA and PRA Info set to second information about the at least one area of interest. The fourth request is an Insert Subscriber Data Request message having PRA Info set to fourth information about the at least one area of interest. The first monitored result is received in an Insert Subscriber Data Answer message having PRA Status set to the first monitored result, and is sent in a Monitoring Response message having PRA Status set to the first monitored result.

In an embodiment of the disclosure, the second information indicates the at least one area of interest in a same or different manner than the fourth information.

According to a fourth aspect of the disclosure, there is provided a method implemented at a mobility management node. The method comprises receiving, from an HSS, a fourth request for initiating PRA functionality for at least one UE. The PRA functionality is used to monitor whether the at least one UE is located in at least one area of interest. The method further comprises monitoring whether the at least one UE is located in the at least one area of interest. The method further comprises sending at least one monitored result to an SCEF entity directly or via the HSS.

In an embodiment of the disclosure, sending at least one monitored result comprises sending a first monitored result to the HSS in response to the fourth request.

In an embodiment of the disclosure, sending at least one monitored result further comprises sending an updated monitored result directly to the SCEF entity when the presence status of the at least one UE relative to the at least one area of interest has changed.

In an embodiment of the disclosure, the fourth request is an Insert Subscriber Data Request message having PRA Info set to fourth information about the at least one area of interest. The first monitored result is sent in an Insert Subscriber Data Answer message having PRA Status set to the first monitored result. The updated monitored result is sent in a Monitoring Indication message having PRA Status set to the updated monitored result.

According to a fifth aspect of the disclosure, there is provided a method implemented at a PCRF entity. The method comprises receiving, from an SCEF entity, a third request for initiating PRA functionality for at least one UE. The PRA functionality is used to monitor whether the at least one UE is located in at least one area of interest. The method further comprises obtaining at least one monitored result for the at least one UE from a mobility management node via a policy and charging enforcement node. The method further comprises sending the at least one monitored result to the SCEF entity.

In an embodiment of the disclosure, an amount of the at least one UE is one. The third request is an AAR message with Specific Action set to PRA and PRA Info set to third information about the at least one area of interest. The at least one monitored result is sent in an RAR message with Specific Action set to PRA and PRA Status set to the at least one monitored result.

In an embodiment of the disclosure, an amount of the at least one UE is more than one. The third request is a Monitoring Request message having Monitoring Type set to PRA, PRA Info set to third information about the at least one area of interest, as well as External Group Identifier for the more than one UEs. The at least one monitored result is sent in a Monitoring Indication message having PRA Status set to the at least one monitored result.

According to a sixth aspect of the disclosure, there is provided an SCEF entity. The SCEF entity comprises a processor and a memory. The memory contains instructions executable by the processor, whereby the SCEF entity is operative to receive, from a requesting server, a first request for initiating PRA functionality for at least one UE. The PRA functionality is used to monitor whether the at least one UE is located in at least one area of interest. The SCEF entity is further operative to obtain at least one monitored result for the at least one UE from a mobility management node via an HSS or via a PCRF entity. The SCEF entity is further operative to send the at least one monitored result to the requesting server.

In an embodiment of the disclosure, the SCEF entity is operative to perform the method according to the above first aspect.

According to a seventh aspect of the disclosure, there is provided a requesting server. The requesting server comprises a processor and a memory. The memory contains instructions executable by the processor, whereby the requesting server is operative to send to an SCEF entity a first request for initiating PRA functionality for at least one UE. The PRA functionality is used to monitor whether the at least one UE is located in at least one area of interest. The requesting server is further operative to receive at least one monitored result for the at least one UE from the SCEF entity.

In an embodiment of the disclosure, the requesting server is operative to perform the method according to the above second aspect.

According to an eighth aspect of the disclosure, there is provided an HSS. The HSS comprises a processor and a memory. The memory contains instructions executable by the processor, whereby the HSS is operative to receive, from an SCEF entity, a second request for initiating PRA functionality for at least one UE. The PRA functionality is used to monitor whether the at least one UE is located in at least one area of interest. The HSS is further operative to obtain at least one monitored result for the at least one UE from a mobility management node. The HSS is further operative to send the at least one monitored result to the SCEF entity.

In an embodiment of the disclosure, the HSS is operative to perform the method according to the above third aspect.

According to a ninth aspect of the disclosure, there is provided a mobility management node. The mobility management node comprises a processor and a memory. The memory contains instructions executable by the processor, whereby the mobility management node is operative to receive, from an HSS, a fourth request for initiating PRA functionality for at least one UE. The PRA functionality is used to monitor whether the at least one UE is located in at least one area of interest. The mobility management node is further operative to monitor whether the at least one UE is located in the at least one area of interest. The mobility management node is further operative to send at least one monitored result to an SCEF entity directly or via the HSS.

In an embodiment of the disclosure, the mobility management node is operative to perform the method according to the above fourth aspect.

According to a tenth aspect of the disclosure, there is provided a PCRF entity. The PCRF entity comprises a processor and a memory. The memory contains instructions executable by the processor, whereby the PCRF entity is operative to receive, from an SCEF entity, a third request for initiating PRA functionality for at least one UE. The PRA functionality is used to monitor whether the at least one UE is located in at least one area of interest. The PCRF entity is further operative to obtain at least one monitored result for the at least one UE from a mobility management node via a policy and charging enforcement node. The PCRF entity is further operative to send the at least one monitored result to the SCEF entity.

In an embodiment of the disclosure, the PCRF entity is operative to perform the method according to the above fifth aspect.

According to an eleventh aspect of the disclosure, there is provided a computer program product. The computer program product comprises instructions which when executed by at least one processor, cause the at least one processor to perform the method according to any of the above first to fifth aspects.

According to a twelfth aspect of the disclosure, there is provided a computer readable storage medium. The computer readable storage medium comprises instructions which when executed by at least one processor, cause the at least one processor to perform the method according to any of the above first to fifth aspects.

According to a thirteenth aspect of the disclosure, there is provided an SCEF entity. The SCEF entity comprises a reception module for receiving, from a requesting server, a first request for initiating PRA functionality for at least one UE. The PRA functionality is used to monitor whether the at least one UE is located in at least one area of interest. The SCEF entity further comprises an obtaining module for obtaining at least one monitored result for the at least one UE from a mobility management node via an HSS or via a PCRF entity. The SCEF entity further comprises a sending module for sending the at least one monitored result to the requesting server.

According to a fourteenth aspect of the disclosure, there is provided a requesting server. The requesting server comprises a sending module for sending to an SCEF entity a first request for initiating PRA functionality for at least one UE. The PRA functionality is used to monitor whether the at least one UE is located in at least one area of interest. The requesting server further comprises a reception module for receiving at least one monitored result for the at least one UE from the SCEF entity.

According to a fifteenth aspect of the disclosure, there is provided an HSS. The HSS comprises a reception module for receiving, from an SCEF entity, a second request for initiating PRA functionality for at least one UE. The PRA functionality is used to monitor whether the at least one UE is located in at least one area of interest. The HSS further comprises an obtaining module for obtaining at least one monitored result for the at least one UE from a mobility management node. The HSS further comprises a sending module for sending the at least one monitored result to the SCEF entity.

According to a sixteenth aspect of the disclosure, there is provided a mobility management node. The mobility management node comprises a reception module for receiving, from an HSS, a fourth request for initiating PRA functionality for at least one UE. The PRA functionality is used to monitor whether the at least one UE is located in at least one area of interest. The mobility management node further comprises a monitoring module for monitoring whether the at least one UE is located in the at least one area of interest. The mobility management node further comprises a sending module for sending at least one monitored result to an SCEF entity directly or via the HSS.

According to a seventeenth aspect of the disclosure, there is provided a PCRF entity. The PCRF entity comprises a reception module for receiving, from an SCEF entity, a third request for initiating PRA functionality for at least one UE. The PRA functionality is used to monitor whether the at least one UE is located in at least one area of interest. The PCRF entity further comprises an obtaining module for obtaining at least one monitored result for the at least one UE from a mobility management node via a policy and charging enforcement node. The PCRF entity further comprises a sending module for sending the at least one monitored result to the SCEF entity.

According to some embodiment(s) of the disclosure, the PRA functionality can be extended to be further used for capability exposure.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

3GPP has defined presence reporting area (PRA) functionality which is used to monitor whether a UE is located in one or more predefined or UE specific areas and report it. In this functionality, policy and charging rules function (PCRF) subscribes the PRA event towards policy and charging enforcement function (PCEF)/packet data network (PDN) gateway (PGW) and also provides the PRA information. The PCEF/PGW will then subscribe the PRA report from MME and report it to the PCRF whenever the UE leaves or enters the areas as defined in the PRA information.

However, the PRA status report terminates at the PCRF and cannot be used for capability exposure. Thus, only location reporting event has been exposed for tracking a UE's location. This may result in the problems below.

Firstly, location reporting event provides the support to continuously monitor and report a UE's current location. The granularity is on cell level (e.g., cell global identifier (CGI)/E-UTRAN CGI (ECGI) level), evolved node B (eNodeB) level, or tracking area (TA)/routing area (RA) level, which is relatively a small area. As a result, it introduces too much extra signaling in the network for exposure of a UE's location. The smaller the granularity is, the more signaling will be introduced. Note that the term E-UTRAN refers to evolved universal mobile telecommunications system (UMTS) terrestrial radio access network.

Secondly, from service perspective, sometimes a service does not require exact location reporting and the PRA level reporting is enough. For example, for sharing bike service, the service operator wants to monitor whether a bike is in or out of a city (or a district within a city) and will take some actions, such as sending a message reminding the bike rider when the bike leaves the city. For such service, the continuous location reporting is too expensive and too heavy.

The present disclosure proposes solutions for exposure of PRA functionality. Hereinafter, the solutions will be described in detail with reference to FIGS. 1-12.

Figure 1:
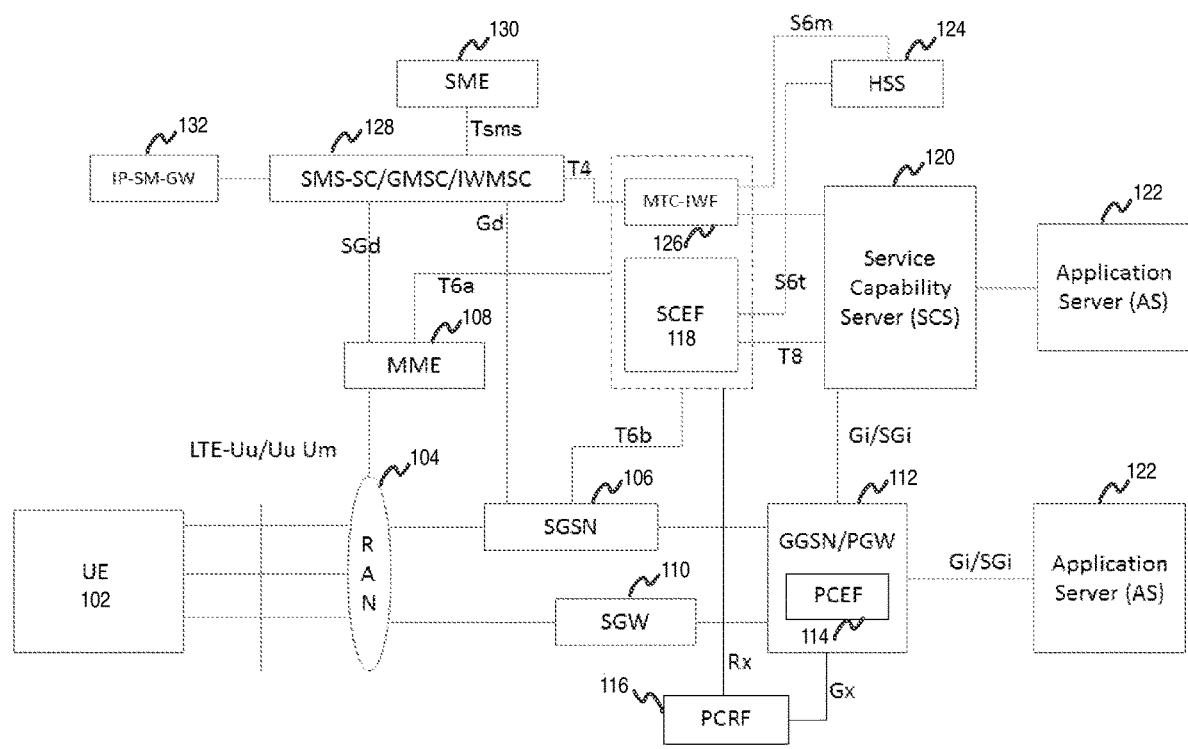
FIG. 1 is a schematic diagram showing an exemplary wireless communication system into which an embodiment of the disclosure is applicable.

FIG. 1 is a schematic diagram showing an exemplary wireless communication system into which an embodiment of the disclosure is applicable. At least part of the wireless communication system may follow any suitable communication standards, such as long term evolution (LTE)-advanced (LTE-A), LTE, wideband code division multiple access (WCDMA), high-speed packet access (HSPA), and so on.

Furthermore, the communications may be performed in the wireless communication system according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

As shown, the wireless communication system comprises at least a user equipment (UE) 102, a radio access network (RAN) 104, a serving general packet radio service (GPRS) support node (SGSN) 106, a mobility management entity (MME) 108, a serving gateway (SGW) 110, a gateway GPRS support node (GGSN)/packet data network (PDN) gateway (PGW) 112, a policy and charging rules function (PCRF) 116, a service capability exposure function (SCEF) 118, a service capability server (SCS) 120, an application server (AS) 122 and a home subscriber server (HSS) 124. The GGSN/PGW 112 comprises a policy and charging enforcement function (PCEF) 114. Note that the amount of each entity mentioned above may be more than one.

The UE 102 can communicate through a radio access communication link with the RAN 104. The UE may also be referred to as, for example, mobile station, mobile unit, subscriber station, access terminal, terminal device, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 104 may include, for example, an universal mobile telecommunications system (UMTS) terrestrial RAN (UTRAN), a global system for mobile communication (GSM) enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to UEs that are within their respective communication service cells. The E-UTRAN can include radio base station nodes (eNodeBs) that can provide the combined functionality of the RNC nodes and base stations of the UTRAN and the GERAN. The UE 102 may communicate with the GERAN via Um interface and communicate with the UTRAN and the E-UTRAN via Uu interface.

The SGSN 106 is a core network node in the UMTS and has a user-plane function and a control-plane function. The user-plane function of the SGSN 106 can transfer user data packets of the UE 102 between the RAN 104 and the GGSN/PGW 112. The control-plane function of the SGSN 106 can carry out mobility management of the UE 102, bearer management and the like. Furthermore, the SGSN 106 may operate as a mobility anchor for the user plane during inter-RNC handovers of the UE 102.

The MME 108 is a core network node in evolved packet system (EPS) and can carry out the mobility management of the UE 102, the bearer management, and the like. The SGW 110 is a packet transfer node in the core network of the EPS. The SGW 110 can transfers user data packets of the UE 102 between the RAN 104 and the GGSN/PGW 112. Furthermore, the SGW 110 may operate as a mobility anchor for the user plane during inter-eNodeB handovers of the UE 102.

The GGSN is a core network node in the UMTS. The PGW is a core network node in the EPS. The GGSN/PGW 112 means either the GGSN or the PGW or both. The GGSN/PGW 112 is a user-plane packet transfer node in the core network and can transfer user data packets of the UE 102. The GGSN/PGW 112 can serve as a gateway to an external PDN and provide the UE 102 with the connectivity to the external PDN.

The PCEF 114 included in the GGSN/PGW 112 can carry out quality of service (QoS) control and flow based bearer charging (FBC) per service data flow of the UE 102 in accordance with a policy and charging control (PCC) rule supplied from the PCRF 116. Correspondingly, the PCRF 116 is a control-plane entity in the core network of the EPS. The PCRF 116 can determine a PCC rule to be applied to a service data flow of the UE 102 and send the determined PCC rule to the GGSN/PGW 112 having the PCEF 114. The PCRF 116 may communicate with the PCEF 114 via Gx interface.

The SCEF 118 can securely expose the services and capabilities provided by 3GPP networks by providing access to the services and capabilities through homogenous network application programming interfaces (APIs) defined by open mobile alliance (OMA), GSM alliance (GSMA) and possibly other standardization bodies. The SCEF 118 may communicate with the PCRF 116 via Rx interface, with the MME 108 via T6a interface, and with the SGSN 106 via T6b interface.

The SCS 120 can make open service access (OSA) standard interfaces accessible by application and provide an abstraction of network protocol for application developers. As a gateway between applications and the network, the SCS 120 can accomplish mapping of OSA interfaces onto network protocols and vice versa. The SCS 120 may communicate with the GGSN/PGW 112 via Gi/SGi interface and with the SCEF 118 via T8 interface. The AS 122 may be a type of server designed to install, operate and host applications and associated services for users. The AS 122 may communicate with the GGSN/PGW 112 via Gi/SGi interface. The HSS 124 is a control-plane node in the core network of 3GPP public land mobile network (PLMN) and can manage subscriber information of the UE 102. The HSS 124 may communicate with the SCEF 118 via S6t interface.

As shown in FIG. 1, the wireless communication system may further comprise a machine-type communication (MTC)-interworking function (IWF) 126, a short message service (SMS)-service center (SC)/gateway mobile switching center (GMSC)/interworking MSC (IWMSC) 128, a short message entity (SME) 130 and an Internet protocol (IP)-short message (SM)-gateway (GW) 132. The MTC-IWF 126 can serve as a control-plane interface or gateway to allow a 3GPP PLMN and a machine-to-machine (M2M) service layer to cooperate (interwork) with each other while hiding the details of the topology of the 3GPP PLMN.

The SMS-SC/GMSC/IWMSC 128 can transmit short messages of a mobile terminated direction to the UE 102 through the SGSN 106 or the MME 108, and receive short messages of a mobile originated direction from the UE 102. The SME 130 may be a communication device or system capable of sending and receiving short messages, e.g., a cellular telephone handset, a phone, or a computer-based communication system. The IP-SM-GW 132 can provide the protocol interworking for the submission of short messages from the short message (SM)-over-IP sender to the service center.

Figure 2:
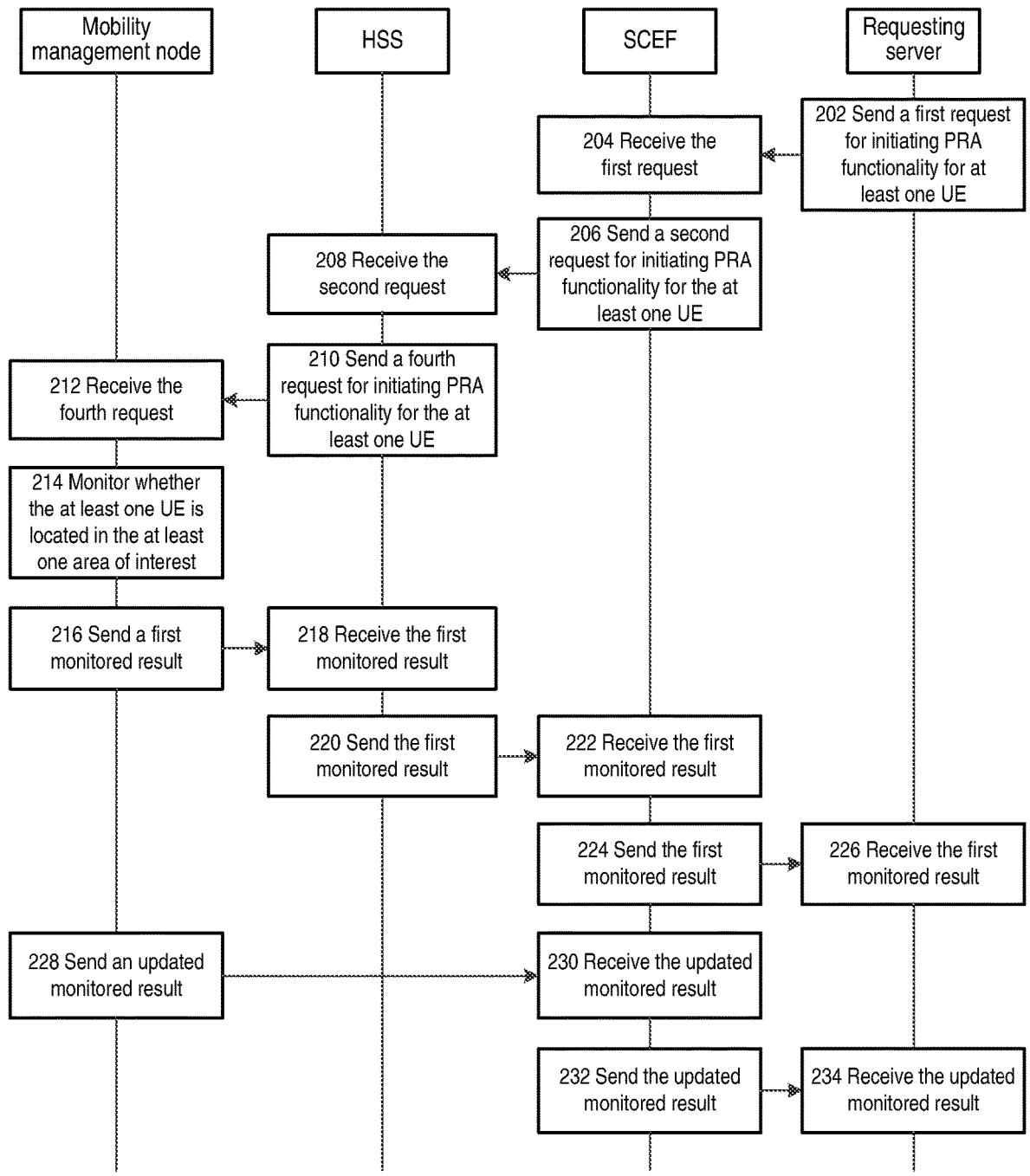
FIG. 2 is a flowchart illustrating a process according to an embodiment of the disclosure.

FIG. 2 is a flowchart illustrating a process according to an embodiment of the disclosure. As shown, the process involves four types of entities, i.e. a requesting server, an SCEF entity, an HSS and a mobility management node. The requesting server may be, for example, an SCS or an AS. The mobility management node may be, for example, an MME or an SGSN.

At block 202, the requesting server sends to the SCEF entity a first request for initiating PRA functionality for at least one UE. The PRA functionality is used to monitor whether the at least one UE is located in at least one area of interest. Correspondingly, at block 204, the SCEF entity receives the first request from the requesting server. The first request may include the identity of the at least one UE and first information about the at least one area of interest. The identity of the UE may include, but not limited to, mobile subscriber international ISDN number (MSISDN), external ID (e.g., IP address), or the like. The term ISDN refers to integrated services digital network. The at least one area of interest may be specified by the entity related to a service which is provided by the requesting server. The first information may indicate the at least one area of interest in any suitable manner. For example, in sharing bike service, the service operator may want to monitor whether a bike is in or out of a city. Then, the first information may take the form of the city's name, postal code or the like.

For example, the first request may be a Monitoring Request message having Monitoring Type set to PRA and PRA Info set to the first information. If an amount of the at least one UE is more than one, the Monitoring Request message may further include External Group Identifier and Group Reporting Guard Time for the more than one UEs. The Monitoring Request message may be sent from the requesting server to the SCEF entity via T8 interface.

At block 206, the SCEF entity sends to the HSS a second request for initiating PRA functionality for the at least one UE. Correspondingly, at block 208, the HSS receives the second request from the SCEF entity. Similar to the first request, the second request may include the identity of the at least one UE and second information about the at least one area of interest. As a first option, the second information may be the same as the first information. As a second option, the second information may indicate the at least one area of interest in a different manner than the first information. For example, in the sharing bike service mentioned above, the SCEF entity may perform a mapping from the city's name to corresponding tracking areas (TAs) and take the identification information of these TAs as the second information.

For example, the second request may be a Monitoring Request message having Monitoring Type set to PRA and PRA Info set to the second information. If the amount of the at least one UE is more than one, the Monitoring Request message may further include the External Group Identifier and the Group Reporting Guard Time for the more than one UEs. The Monitoring Request message may be sent from the SCEF entity to the HSS via S6t interface.

At block 210, the HSS sends to the mobility management node a fourth request for initiating PRA functionality for the at least one UE. Correspondingly, at block 212, the mobility management node receives the fourth request from the HSS. If the amount of the at least one UE is more than one, the HSS may send a fourth request for each UE. The fourth request may include the identity of the UE and fourth information about the at least one area of interest. If the second information is the same as the first information, the fourth information may be the same as the second information, or may indicate the at least one area of interest in a different manner than the second information by, for example, performing the mapping mentioned above. If the second information is different from the first information (for example, due to the mapping mentioned above), the fourth information may be the same as the second information.

For example, the fourth request may be an Insert Subscriber Data Request message having PRA Info set to the fourth information. The Insert Subscriber Data Request message may be sent from the HSS to the mobility management node via S6a/d interface.

At block 214, the mobility management node monitors whether the at least one UE is located in the at least one area of interest. If the second and fourth information is the same as the first information, the mobility management node may perform the mapping mentioned above. That is, the mapping may be performed at any one of the SCEF entity, the HSS and the mobility management node. Block 214 may be implemented by executing step 6 of clause 5.6.1.1 of 3GPP TS23.682. This technical specification is incorporated herein by reference in its entirety.

At block 216, the mobility management node sends a first monitored result to the HSS in response to the fourth request. Correspondingly, at block 218, the HSS receives the first monitored result from the mobility management node. If the amount of the at least one UE is more than one, the mobility management node may send the first monitored result for each UE. For example, the first monitored result may be sent and received in an Insert Subscriber Data Answer message having PRA Status set to the first monitored result.

At block 220, the HSS sends the first monitored result to the SCEF entity. Correspondingly, at block 222, the SCEF entity receives the first monitored result from the HSS. For example, the first monitored result may be sent and received in a Monitoring Response message having PRA Status set to the first monitored result.

At block 224, the SCEF entity sends the first monitored result to the requesting server. Correspondingly, at block 226, the requesting server receives the first monitored result from the SCEF entity. For example, the first monitored result may be sent and received in a Monitoring Response message having PRA Status set to the first monitored result.

Then, when the presence status of the at least one UE relative to the at least one area of interest has changed, the mobility management node detects this change by performing block 214. In response to this detection, the mobility management node sends an updated monitored result directly to the SCEF entity at block 228. Correspondingly, at block 230, the SCEF entity receives the updated monitored result from the mobility management node. For example, the updated monitored result may be sent and received via T6a interface in a Re-Authorization Request (RAR) message with Specific Action set to PRA and PRA Status set to the updated monitored result.

At block 232, the SCEF entity sends the updated monitored result to the requesting server. Correspondingly, at block 234, the requesting server receives the updated monitored result from the SCEF entity. For example, the updated monitored result may be sent and received in a Monitoring Indication message having PRA Status set to the updated monitored result.

In this way, the PRA functionality can be extended to be further used for capability exposure. The PRA capability exposure, i.e. event monitoring and report, provides an efficient and light solution for the location tracking for some service such as sharing bike service. This in turn will reduce the cost on the network resource and the cost of service operator.

Figure 3:
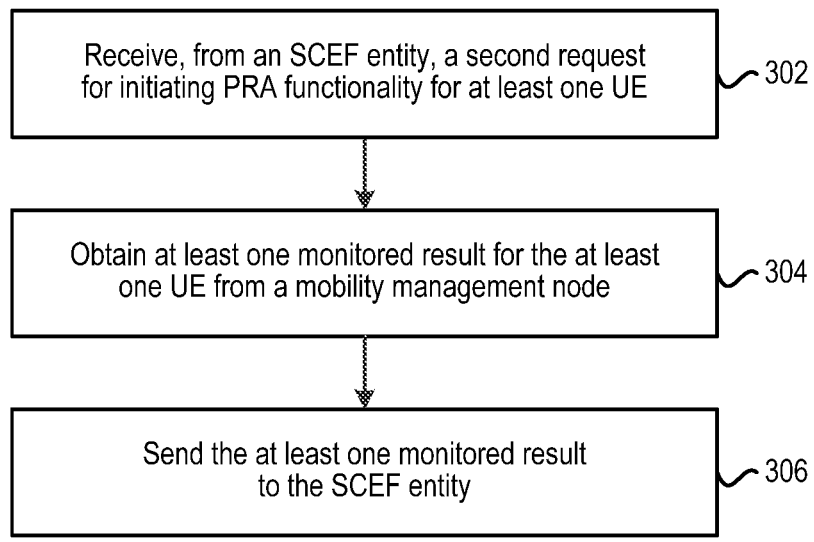
FIG. 3 is a flowchart illustrating a method implemented at an HSS according to an embodiment of the disclosure.

FIG. 3 is a flowchart illustrating a method implemented at an HSS according to an embodiment of the disclosure. At block 302, the HSS receives, from an SCEF entity, a second request for initiating PRA functionality for at least one UE. The PRA functionality is used to monitor whether the at least one UE is located in at least one area of interest. Block 302 may be the same as block 208. At block 304, the HSS obtains at least one monitored result for the at least one UE from a mobility management node. For example, block 304 may be implemented as blocks 210 and 218. At block 306, the HSS sends the at least one monitored result to the SCEF entity. Block 306 may be the same as block 220.

Figure 4:
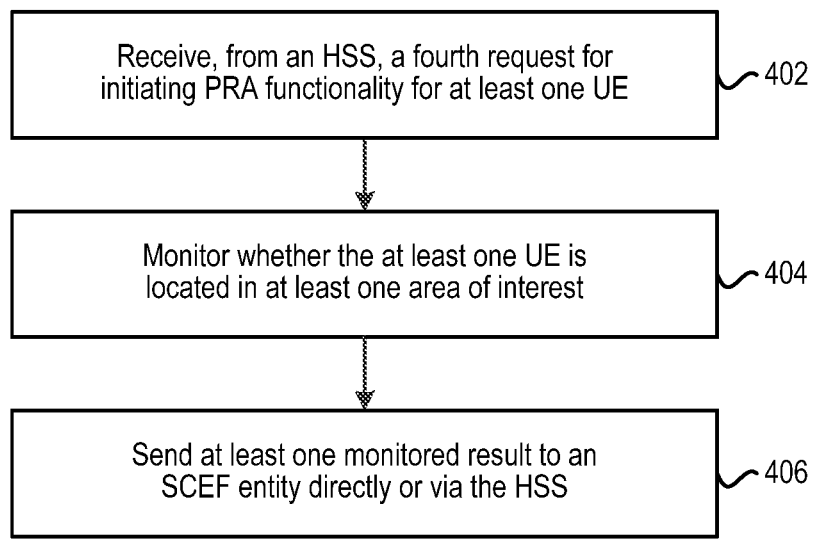
FIG. 4 is a flowchart illustrating a method implemented at a mobility management node according to an embodiment of the disclosure.

FIG. 4 is a flowchart illustrating a method implemented at a mobility management node according to an embodiment of the disclosure. At block 402, the mobility management node receives, from an HSS, a fourth request for initiating PRA functionality for at least one UE. The PRA functionality is used to monitor whether the at least one UE is located in at least one area of interest. Block 402 may be the same as block 212. At block 404, the mobility management node monitors whether the at least one UE is located in the at least one area of interest. Block 404 may be the same as block 214. At block 406, the mobility management node sends at least one monitored result to an SCEF entity directly or via the HSS. Block 406 may be implemented as blocks 216 and 228.

Figure 5:
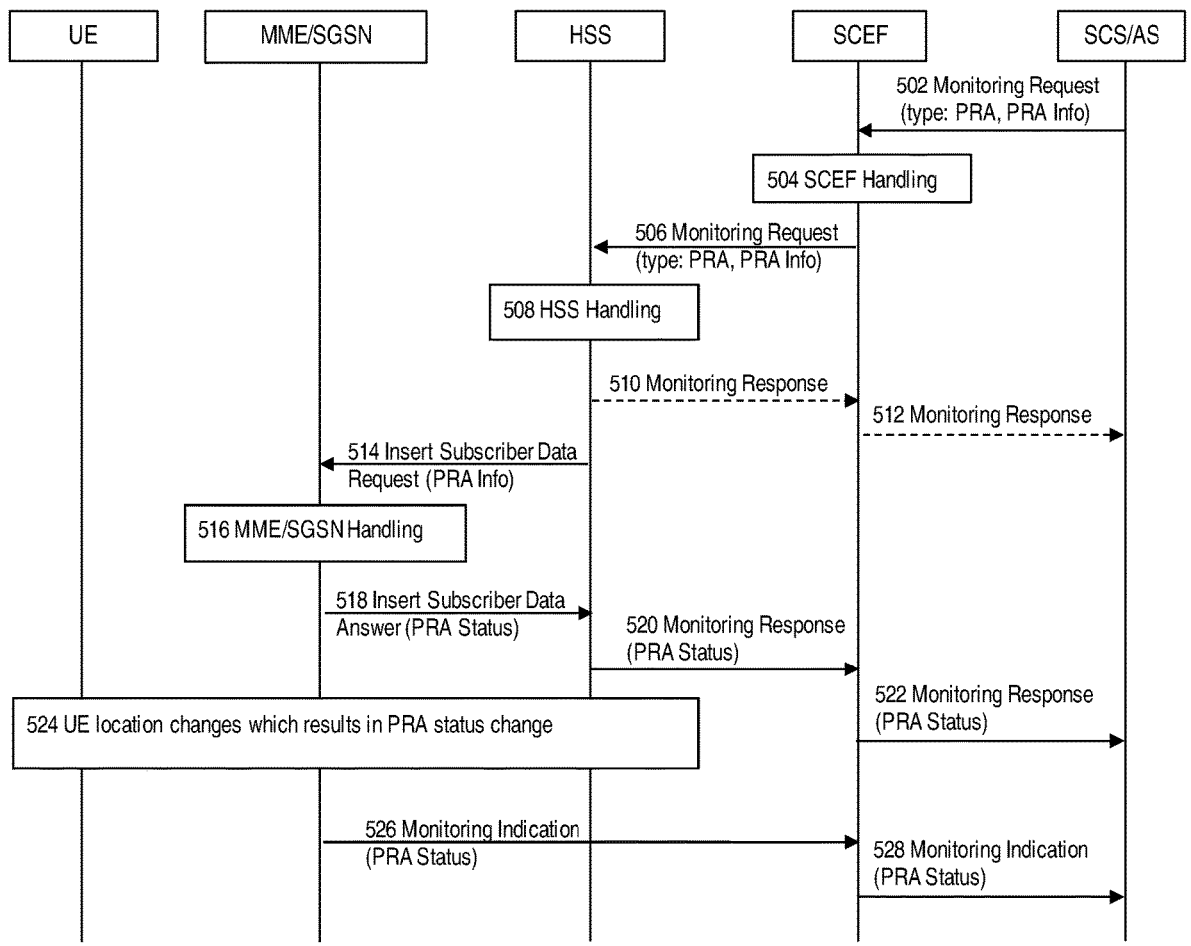
FIG. 5 is a flowchart illustrating an exemplary solution according to an embodiment of the disclosure.

FIG. 5 is a flowchart illustrating an exemplary solution according to an embodiment of the disclosure. In this solution, the requesting server is an SCS or an AS. The mobility management node is an MME or an SGSN. At block 502, the SCS/AS sends a Monitoring Request message to the SCEF. Monitoring Type in the Monitoring Request message is set to PRA and PRA Info is included in the Monitoring Request message. The PRA Info includes the information about the area(s) of interest. If the SCS/AS wants to configure Monitoring Event for a group of UEs, the Monitoring Request message may further include External Group Identifier and Group Reporting Guard Time.

At block 504, the SCEF may reject the request if the SCS/AS is not authorized or the configuration parameters are not authorized. This may be done by executing step 2 of clause 5.6.1.1 of 3GPP TS23.682. At block 506, the SCEF sends a Monitoring Request message to the HSS. Monitoring Type in the Monitoring Request message is set to PRA and PRA Info is included in the Monitoring Request message. Some details of block 506 may be similar to step 3 of clause 5.6.1.1 of 3GPP TS23.682.

At block 508, the HSS stores the UE PRA Event. The HSS may reject the request if the configuration parameters are not authorized. This may be done by executing step 4 of clause 5.6.1.1 of 3GPP TS23.682. For group based processing, if the HSS receives the Monitoring Request message with an External Group Identifier, the HSS may send a Monitoring Response (SCEF Reference ID, Cause) message to the SCEF at block 510 to acknowledge acceptance of the Monitoring Request immediately before beginning the processing of individual UEs, indicating that Group processing is in progress. The HSS may delete the monitoring event configuration identified by the SCEF Reference ID, if it was requested. At block 512, the SCEF may reply to the SCS/AS with a Monitoring Response message indicating that Group processing is in progress.

At block 514, the HSS sends an Insert Subscriber Data Request message to the MME/SGSN. The PRA Info for the UE is included in the Insert Subscriber Data Request message. Some details of block 514 may be similar to step 5 of clause 5.6.1.1 of 3GPP TS23.682. At block 516, the MME/SGSN executes step 6 of clause 5.6.1.1 of 3GPP TS23.682. At block 518, the MME/SGSN reports the PRA Status for the UE to the HSS in an Insert Subscriber Data Answer message. Some details of block 518 may be similar to step 7 of clause 5.6.1.1 of 3GPP TS23.682.

At block 520, the HSS reports the PRA Status for the UE to the SCEF in a Monitoring Response message. Some details of block 520 may be similar to step 8 of clause 5.6.1.1 of 3GPP TS23.682. At block 522, the SCEF reports the PRA Status for the UE to the SCS/AS in a Monitoring Response message. Some details of block 522 may be similar to step 9 of clause 5.6.1.1 of 3GPP TS23.682.

At block 524, there is a location change, e.g. tracking area update (TAU) or eNodeB change, which results in a PRA status change. In response to this, the MME/SGSN reports the updated PRA Status for the UE to the SCEF at block 526. Some details of block 526 may be similar to step 2a of clause 5.6.3.1 of 3GPP TS23.682. At block 528, the SCEF reports the updated PRA Status for the UE to the SCS/AS. Some details of block 528 may be similar to step 3 of clause 5.6.3.1 of 3GPP TS23.682.

Figure 6:
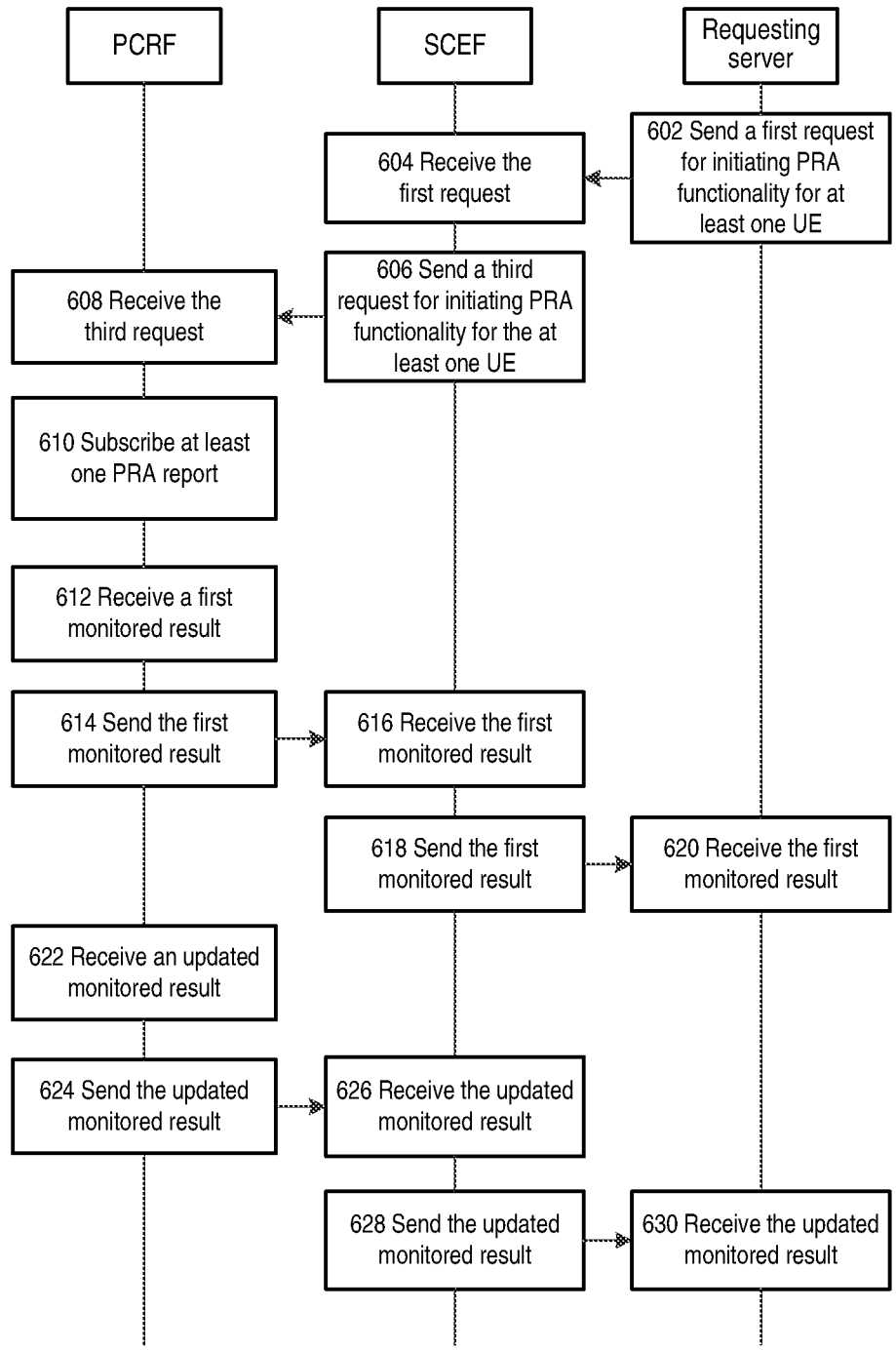
FIG. 6 is a flowchart illustrating a process according to another embodiment of the disclosure.

FIG. 6 is a flowchart illustrating a process according to another embodiment of the disclosure. As shown, the process involves three types of entities, i.e. a requesting server, an SCEF entity and a PCRF entity. The requesting server may be, for example, an SCS or an AS. At block 602, the requesting server sends to the SCEF entity a first request for initiating PRA functionality for at least one UE. The PRA functionality is used to monitor whether the at least one UE is located in at least one area of interest. Correspondingly, at block 604, the SCEF entity receives the first request from the requesting server. Blocks 602 and 604 may be the same as blocks 202 and 204, respectively.

At block 606, the SCEF entity sends to the PCRF entity a third request for initiating PRA functionality for the at least one UE. Correspondingly, at block 608, the PCRF entity receives the third request from the SCEF entity. If the amount of the at least one UE is more than one, the SCEF entity may send the third request to each PCRF entity in the operator's network. Similar to the first request, the third request may include the identity of the at least one UE and third information about the at least one area of interest. The third information may be the same as the first information, or may indicate the at least one area of interest in a different manner than the first information by, for example, performing the mapping mentioned above.

For example, if the amount of the at least one UE is one, the third request may be an Authentication Authorization Request (AAR) message with Specific Action set to PRA and PRA Info set to the third information. The AAR message may be sent from the SCEF entity to the PCRF entity via Rx interface. If the amount of the at least one UE is more than one, the third request may be a Monitoring Request message having Monitoring Type set to PRA, PRA Info set to the third information, as well as External Group Identifier for the more than one UEs. The Monitoring Request message may be sent from the SCEF entity to each PCRF entity in the operator's network via Nt interface.

At block 610, the PCRF entity subscribes at least one PRA report for the at least one UE to a mobility management node via a policy and charging enforcement node. The policy and charging enforcement node may be, for example, a PCEF entity or a PGW including the PCEF entity. For example, the PCRF may initiate an IP-connectivity access network (CAN) session modification procedure for PRA report subscription. If the amount of the at least one UE is more than one, each PCRF entity may find each UE associated to the PCRF entity and subscribe at least one PRA report for the UE. For example, each PCRF entity may find each UE that has the External Group Identifier associated to the PCRF entity. Then, for each UE that has an IP-CAN session established, the PCRF may initiate the IP-CAN session modification procedure for PRA report subscription. At block 612, the PCRF entity receives a first monitored result from the mobility management node via the policy and charging enforcement node. For example, Blocks 610 and 612 may be implemented as defined in 3GPP TS29.212, which is incorporated herein by reference in its entirety.

At block 614, the PCRF entity sends the first monitored result to the SCEF entity. Correspondingly, at block 616, the SCEF entity receives the first monitored result from the PCRF entity. If the amount of the at least one UE is one, the first monitored result may be sent and received in a Re-Authorization Request (RAR) message with Specific Action set to PRA and PRA Status set to the first monitored result.

If the amount of the at least one UE is more than one, the first monitored result may be sent and received in a Monitoring Indication message having PRA Status set to the first monitored result.

At block 618, the SCEF entity sends the first monitored result to the requesting server. Correspondingly, at block 620, the requesting server receives the first monitored result from the SCEF entity. If the amount of the at least one UE is one, the first monitored result may be sent and received in a Monitoring Indication message having PRA Status set to the first monitored result. If the amount of the at least one UE is more than one, the first monitored result may be sent and received in a Monitoring Indication message having PRA Status set to the first monitored result.

Then, when the presence status of the at least one UE relative to the at least one area of interest has changed, the mobility management node detects this change and sends an updated monitored result to the PCRF entity via the policy and charging enforcement node. Correspondingly, at block 622, the PCRF receives the updated monitored result from the mobility management node.

At block 624, the PCRF entity sends the updated monitored result to the SCEF entity. Correspondingly, at block 626, the SCEF entity receives the updated monitored result from the PCRF entity. If the amount of the at least one UE is one, the updated monitored result may be sent and received in an RAR message with Specific Action set to PRA and PRA Status set to the updated monitored result. If the amount of the at least one UE is more than one, the updated monitored result may be sent and received in a Monitoring Indication message having PRA Status set to the updated monitored result.

At block 628, the SCEF entity sends the updated monitored result to the requesting server. Correspondingly, at block 630, the requesting server receives the updated monitored result from the SCEF entity. If the amount of the at least one UE is one, the updated monitored result may be sent and received in a Monitoring Indication message having PRA Status set to the updated monitored result. If the amount of the at least one UE is more than one, the updated monitored result may be sent in a Monitoring Indication message having PRA Status set to the updated monitored result.

In this way, the PRA functionality can be extended to be further used for capability exposure. The PRA capability exposure, i.e. event monitoring and report, provides an efficient and light solution for the location tracking for some service such as sharing bike service. This in turn will reduce the cost on the network resource and the cost of service operator.

Figure 7:
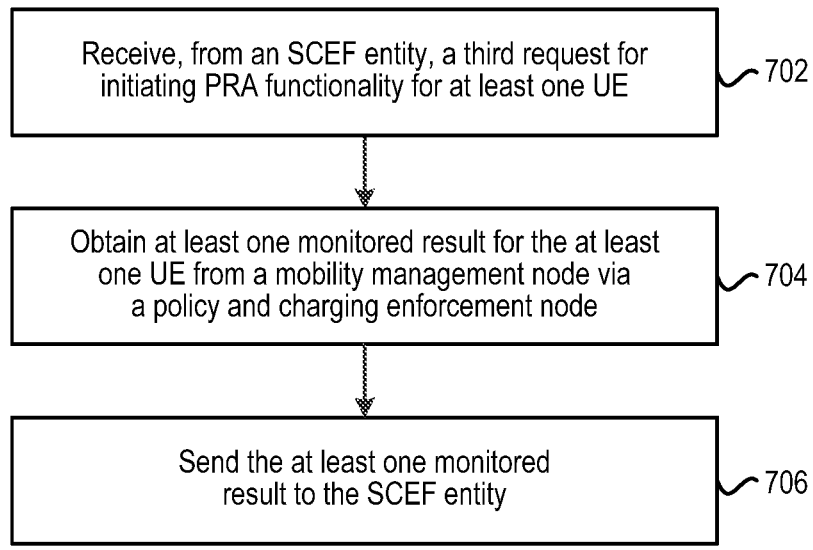
FIG. 7 is a flowchart illustrating a method implemented at a PCRF entity according to another embodiment of the disclosure.

FIG. 7 is a flowchart illustrating a method implemented at a PCRF entity according to another embodiment of the disclosure. At block 702, the PCRF entity receives, from an SCEF entity, a third request for initiating PRA functionality for at least one UE. The PRA functionality is used to monitor whether the at least one UE is located in at least one area of interest. Block 702 may be the same as block 608. At block 704, the PCRF entity obtains at least one monitored result for the at least one UE from a mobility management node via a policy and charging enforcement node. Block 704 may be implemented as blocks 610, 612 and 622. At block 706, the PCRF entity sends the at least one monitored result to the SCEF entity. Block 706 may be implemented as blocks 614 and 624.

Figure 8:
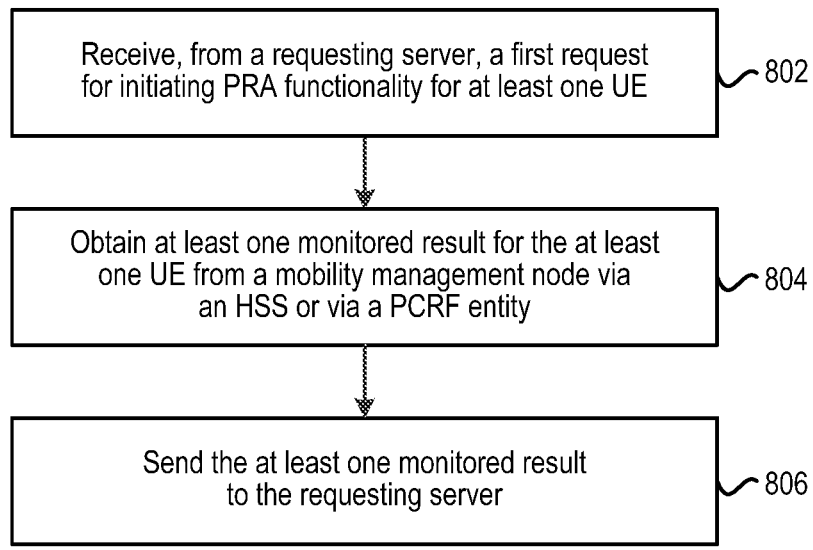
FIG. 8 is a flowchart illustrating a method implemented at an SCEF entity according to an embodiment of the disclosure.

FIG. 8 is a flowchart illustrating a method implemented at an SCEF entity according to an embodiment of the disclosure. At block 802, the SCEF entity receives, from a requesting server, a first request for initiating PRA functionality for at least one UE. The PRA functionality is used to monitor whether the at least one UE is located in at least one area of interest. Block 802 may be implemented as block 204 or 604. At block 804, the SCEF entity obtains at least one monitored result for the at least one UE from a mobility management node via an HSS or via a PCRF entity. Block 804 may be implemented as blocks 206, 222 and 230 or blocks 606, 616 and 626. At block 806, the SCEF entity sends the at least one monitored result to the requesting server. Block 806 may be implemented as blocks 224 and 232 or blocks 618 and 628.

Figure 9:
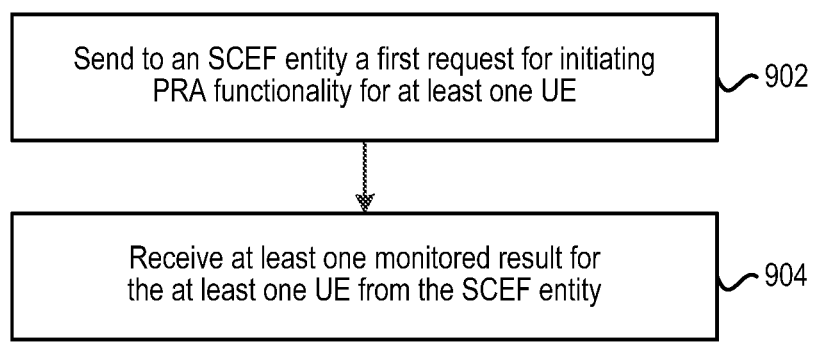
FIG. 9 is a flowchart illustrating a method implemented at a requesting server according to an embodiment of the disclosure.

FIG. 9 is a flowchart illustrating a method implemented at a requesting server according to an embodiment of the disclosure. At block 902, the requesting server sends to an SCEF entity a first request for initiating PRA functionality for at least one UE. The PRA functionality is used to monitor whether the at least one UE is located in at least one area of interest. Block 902 may be implemented as block 202 or 602. At block 904, the requesting server receives at least one monitored result for the at least one UE from the SCEF entity. Block 904 may be implemented as blocks 226 and 234 or blocks 620 and 630.

Figure 10:
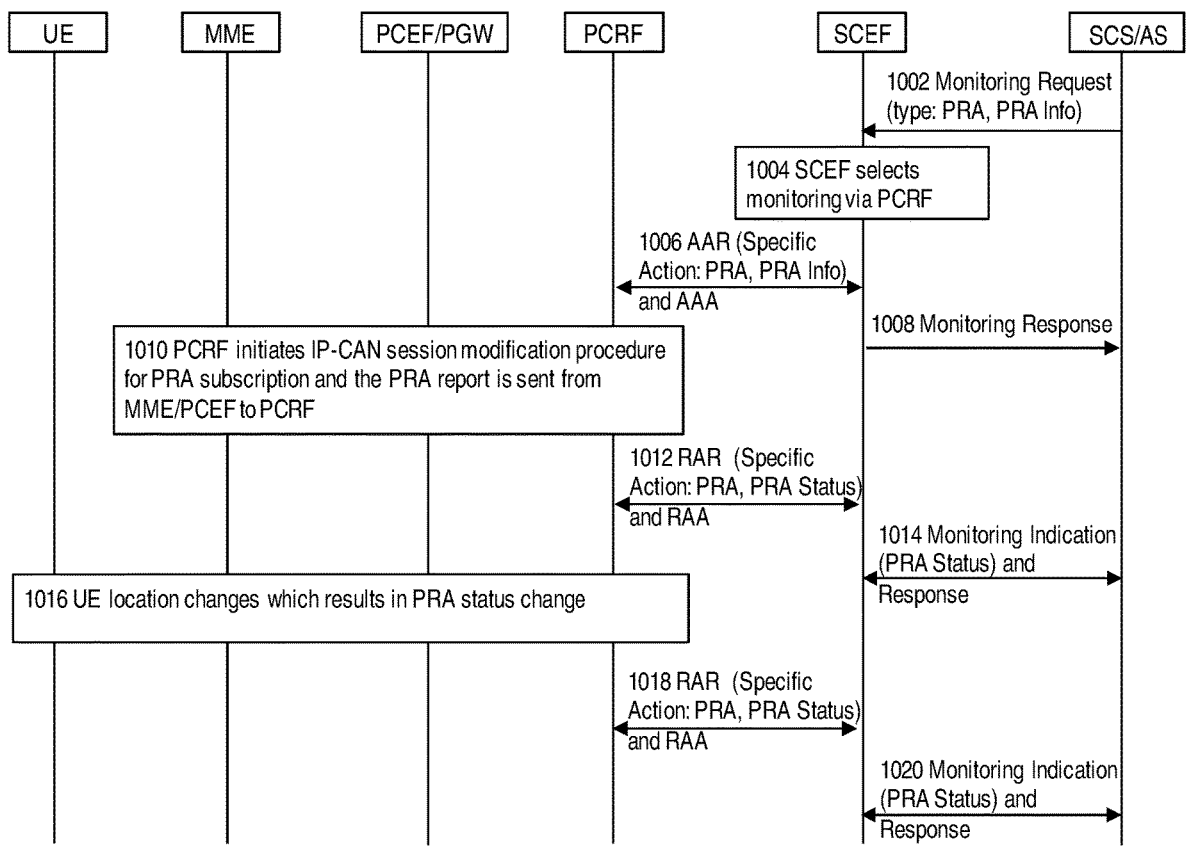
FIG. 10 is a flowchart illustrating an exemplary solution according to another embodiment of the disclosure.

FIG. 10 is a flowchart illustrating an exemplary solution according to another embodiment of the disclosure. This solution relates to single UE PRA exposure. In this solution, the requesting server is an SCS or an AS. The policy and charging enforcement node is a PCEF or a PGW. At block 1002, the SCS/AS sends a Monitoring Request message to the SCEF. Monitoring Type in the Monitoring Request message is set to PRA and PRA Info is included in the Monitoring Request message. The PRA Info includes the information about the area(s) of interest.

At block 1004, the SCEF may determine via which one of the HSS and the PCRF the at least one monitored result is to be obtained, according to an operator policy. In this exemplary solution, it is assumed that the operator policy (or policies) indicates that the monitoring is performed via the PCRF. Thus, the SCEF selects the PCRF.

At block 1006, the SCEF acts as an application function (AF) to send an AAR message to the PCRF via Rx interface. In the AAR message, PRA is set in Specific Action and PRA Info is included. The PCRF answers with an Authentication Authorization Answer (AAA) message. At block 1008, the SCEF sends a Monitoring Response message to the SCS/AS.

At block 1010, the PCRF initiates an IP-CAN session modification procedure for PRA report subscription. The PRA report is sent from the MME to the PCRF via the PCEF/PGW. At block 1012, the PCRF sends an RAR message to the SECF. In the RAR message, PRA is set in Specific Action and PRA Status is included. The PRA Status includes the status report of whether the UE is in or out of the area(s) of interest. The SCEF answers with an Re-Authorization Answer (RAA) message. At block 1014, the SCEF sends a Monitoring Indication message to the SCS/AS. In the Monitoring Indication message, the PRA Status is included. The SCS/AS answers with a Monitoring Indication Response message.

At block 1016, there is a change of the UE's location, which results in a PRA status change. In response to this, the MME reports the updated PRA Status for the UE to the PCRF. At block 1018, the PCRF reports the updated PRA Status for the UE to the SCEF. This may be similar to block 1012. At block 1020, the SCEF reports the updated PRA Status for the UE to the SCS/AS. This may be similar to block 1014.

Figure 11:
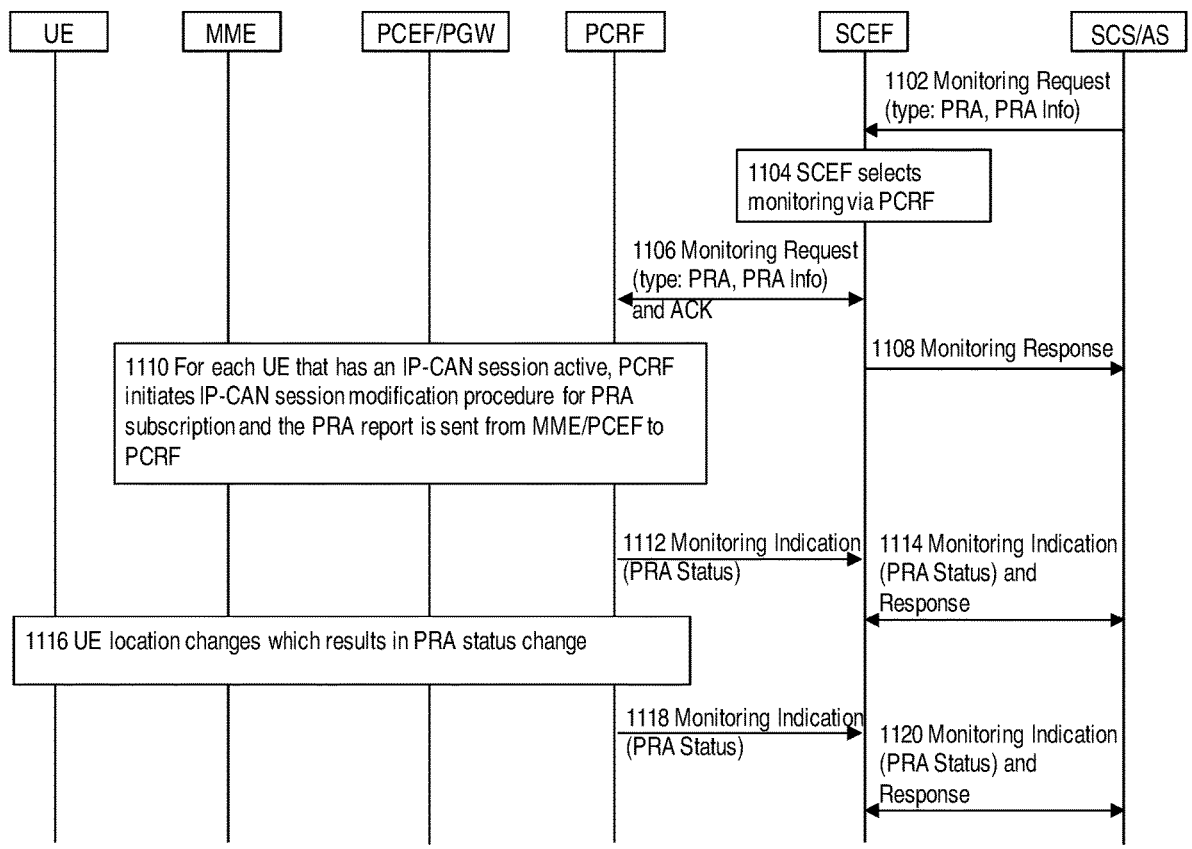
FIG. 11 is a flowchart illustrating an exemplary solution according to another embodiment of the disclosure.

FIG. 11 is a flowchart illustrating an exemplary solution according to another embodiment of the disclosure. This solution relates to group UE PRA exposure. At block 1102, the SCS/AS sends a Monitoring Request message to the SCEF. Monitoring Type in the Monitoring Request message is set to PRA and PRA Info is included in the Monitoring Request message. The PRA Info includes the information about the area(s) of interest. The Monitoring Request message may further include External Group Identifier and Group Reporting Guard Time.

At block 1104, the SCEF may determine via which one of the HSS and the PCRF the at least one monitored result is to be obtained, according to an operator policy. In this exemplary solution, it is assumed that the operator policy (or policies) indicates that the monitoring is performed via the PCRF. Thus, the SCEF selects all PCRFs in the operator's network.

At block 1106, the SCEF sends a Monitoring Request (External Group Identifier, event type: PRA, PRA Info) over Nt interface to each PCRF in the operator's network. The PCRF answers with a Monitoring Response message. At block 1108, the SCEF sends a Monitoring Response message to the SCS/AS.

At block 1110, each PCRF finds each UE that has the External Group Identifier associated to it. Then, for each UE that has an IP-CAN session established, the PCRF initiates an IP-CAN session modification procedure for PRA report subscription. The PRA report is sent from the MME to the PCRF via the PCEF/PGW. At block 1112, the PCRF sends a Monitoring Indication (PRA Status) to the SCEF. The PRA Status is sent for each UE and includes the status report of whether the UE is in or out of the area(s) of interest. The PCRF may indicate to the SCEF when the result for the last UE is sent. At block 1114, the SCEF sends a Monitoring Indication (PRA Status) to the SCS/AS. The SCS/AS answers with a Monitoring Indication Response.

At block 1116, there is a change of the UE's location, which results in a PRA status change. In response to this, the MME reports the updated PRA Status for the UE to the PCRF. At block 1118, the PCRF reports the updated PRA Status for the UE to the SCEF. This may be similar to block 1112. At block 1120, the SCEF reports the updated PRA Status for the UE to the SCS/AS. This may be similar to block 1114.

According to the above description, the following changes may be made to the current 3GPP technical specification. It should be noted that these changes are merely exemplary examples for illustration purpose.
1. T8 interface (between SCS/AS and SCEF): new Monitoring Type: PRA should be added in monitoring type in message "Monitoring Request"; new information element (IE) "PRA Info" should be added in message "Monitoring Request"; and new IE "PRA Status" should be added in messages "Monitoring Response" and "Monitoring Indication".
2. Nt interface (between SCEF and PCRF): new Monitoring Type: PRA should be added in monitoring type in message "Monitoring Request"; new IE "PRA Info" should be added in message "Monitoring Request"; and new IE "PRA Status" should be added in message "Monitoring Indication".
3. Rx interface (between SCEF and PCRF): new value of "PRA" should be added in Specific Action attribute value pair (AVP); new AVP "PRA Info" should be added in message AAR and new AVP "PRA Status" should be added in RAR.
4. S6t interface (between SCEF and HSS): new Monitoring Type: PRA should be added in monitoring type in message "Monitoring Request"; new IE "PRA Info" should be added in message "Monitoring Request"; and new IE "PRA Status" should be added in message "Monitoring Response".
5. S6a/d interface (between HSS and MME/SGSN): new flag of "PRA" should be added in IDR-Flag AVP and ULA-Flag AVP in message Insert Subscriber Data Request (IDR) and update location answer (ULA) respectively; new AVP "PRA Info" should be added in message IDR and ULA; and new AVP "PRA Status" should be added in Insert Subscriber Data Answer (IDA).
6. T6a/b interface (between SCEF and MME/SGSN): new IE "PRA Status" should be added in message "Monitoring Indication".

Figure 12:
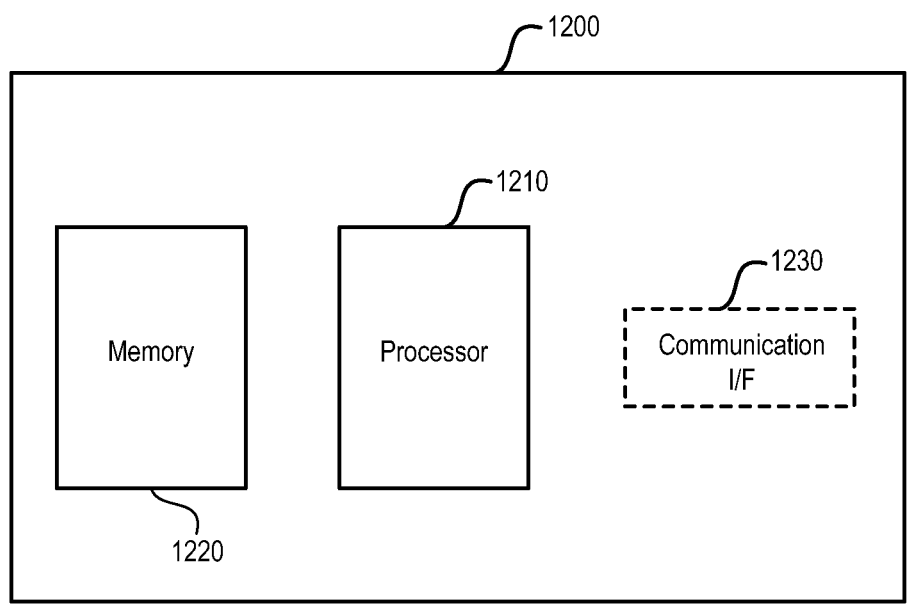
FIG. 12 is a block diagram showing an apparatus suitable for use in practicing some embodiments of the disclosure.

FIG. 12 is a block diagram showing an apparatus suitable for use in practicing some embodiments of the disclosure. For example, any one of the requesting server, the SCEF, the HSS, the mobility management node and the PCRF entity described above may be implemented through the apparatus 1200. As shown, the apparatus 1200 may include a processor 1210, a memory 1220 that stores a program, and optionally a communication interface 1230 for communicating data with other external devices through wired and/or wireless communication.

The program includes program instructions that, when executed by the processor 1210, enable the apparatus 1200 to operate in accordance with the embodiments of the present disclosure, as discussed above. That is, the embodiments of the present disclosure may be implemented at least in part by computer software executable by the processor 1210, or by hardware, or by a combination of software and hardware.

The memory 1220 may be of any type suitable to the local technical environment and may be implemented using any suitable data storage technology, such as semiconductor based memory devices, flash memories, magnetic memory devices and systems, optical memory devices and systems, fixed memories and removable memories. The processor 1210 may be of any type suitable to the local technical environment, and may include one or more of general purpose computers, special purpose computers, microprocessors, digital signal processors (DSPs) and processors based on multi-core processor architectures, as non-limiting examples.

Figure 13:
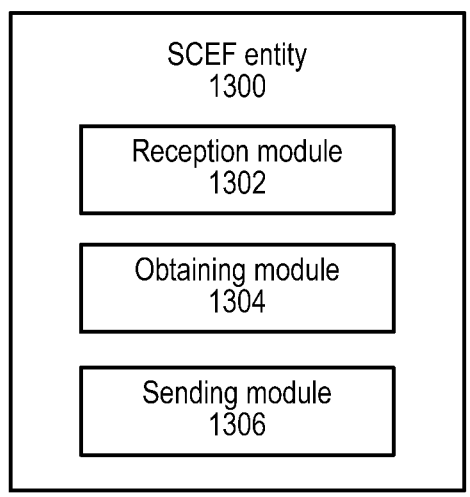
FIG. 13 is a block diagram showing an SCEF entity according to an embodiment of the disclosure.

FIG. 13 is a block diagram showing an SCEF entity according to an embodiment of the disclosure. As shown, the SCEF entity 1300 may comprise a reception module 1302, an obtaining module 1304 and a sending module 1306. The reception module 1302 may be configured to receive, from a requesting server, a first request for initiating PRA functionality for at least one UE (block 802). The PRA functionality is used to monitor whether the at least one UE is located in at least one area of interest. The obtaining module 1304 may be configured to obtain at least one monitored result for the at least one UE from a mobility management node via an HSS or via a PCRF entity (block 804). The sending module 1306 may be configured to send the at least one monitored result to the requesting server (block 806).

Figure 14:
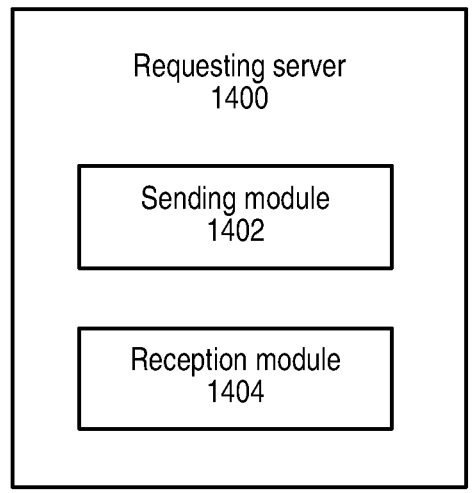
FIG. 14 is a block diagram showing a requesting server according to an embodiment of the disclosure.

FIG. 14 is a block diagram showing a requesting server according to an embodiment of the disclosure. As shown, the requesting server 1400 may comprise a sending module 1402 and a reception module 1404. The sending module 1402 may be configured to send to an SCEF entity a first request for initiating PRA functionality for at least one UE (block 902). The PRA functionality is used to monitor whether the at least one UE is located in at least one area of interest. The reception module 1404 may be configured to receive at least one monitored result for the at least one UE from the SCEF entity (block 904).

Figure 15:
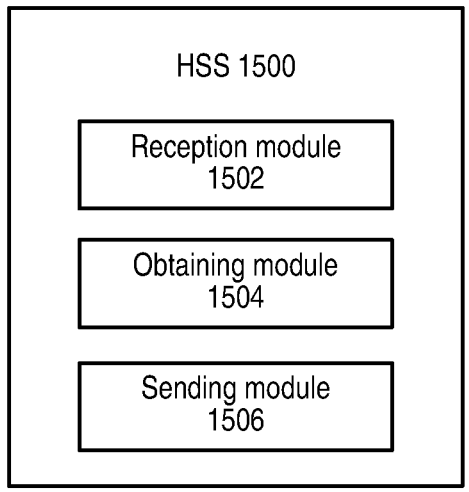
FIG. 15 is a block diagram showing an HSS according to an embodiment of the disclosure.

FIG. 15 is a block diagram showing an HSS according to an embodiment of the disclosure. As shown, the HSS 1500 may comprise a reception module 1502, an obtaining module 1504 and a sending module 1506. The reception module 1502 may be configured to receive, from an SCEF entity, a second request for initiating PRA functionality for at least one UE (block 302). The PRA functionality is used to monitor whether the at least one UE is located in at least one area of interest. The obtaining module 1504 may be configured to obtain at least one monitored result for the at least one UE from a mobility management node (block 304). The sending module 1506 may be configured to send the at least one monitored result to the SCEF entity (block 306).

Figure 16:
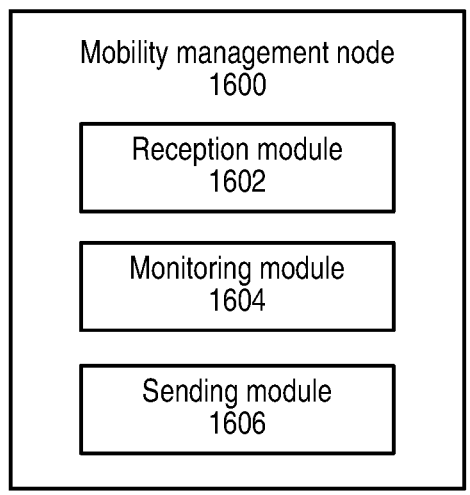
FIG. 16 is a block diagram showing a mobility management node according to an embodiment of the disclosure.

FIG. 16 is a block diagram showing a mobility management node according to an embodiment of the disclosure. As shown, the mobility management node 1600 may comprise a reception module 1602, a monitoring module 1604 and a sending module 1606. The reception module 1602 may be configured to receive, from an HSS, a fourth request for initiating PRA functionality for at least one UE (block 402). The PRA functionality is used to monitor whether the at least one UE is located in at least one area of interest. The monitoring module 1604 may be configured to monitor whether the at least one UE is located in the at least one area of interest (block 404). The sending module 1606 may be configured to send at least one monitored result to an SCEF entity directly or via the HSS (block 406).

Figure 17:
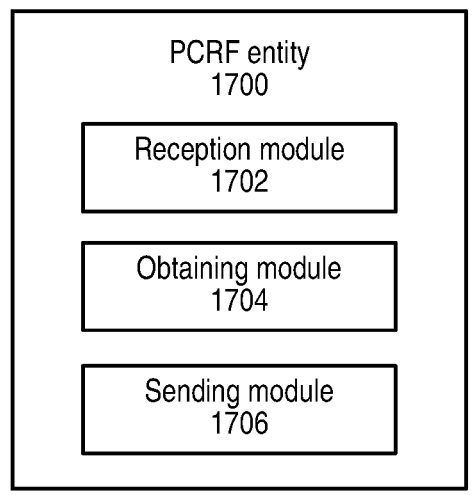
FIG. 17 is a block diagram showing a PCRF entity according to an embodiment of the disclosure.

FIG. 17 is a block diagram showing a PCRF entity according to an embodiment of the disclosure. As shown, the PCRF entity 1700 may comprise a reception module 1702, an obtaining module 1704 and a sending module 1706. The reception module 1702 may be configured to receive, from an SCEF entity, a third request for initiating PRA functionality for at least one UE (block 702). The PRA functionality is used to monitor whether the at least one UE is located in at least one area of interest. The obtaining module 1704 may be configured to obtain at least one monitored result for the at least one UE from a mobility management node via a policy and charging enforcement node (block 704). The sending module 1706 may be configured to send the at least one monitored result to the SCEF entity (block 706).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a service capability exposure function, SCEF, entity, the method comprising:
   receiving, from a requesting server, a first request for initiating presence reporting area, PRA, functionality for at least one user equipment, UE, wherein the PRA functionality is used to monitor whether the at least one UE is located in at least one area of interest;
   obtaining at least one monitored result for the at least one UE from a mobility management node via a home subscriber server, HSS, or via a policy and charging rules function, PCRF, entity, wherein obtaining the at least one monitored result via the PCRF entity comprises:
      sending to the PCRF entity a third request for initiating PRA functionality for the at least one UE;
      receiving a first monitored result from the PCRF; and
      receiving an updated monitored result from the PCRF entity when the presence status of the at least one UE relative to the at least one area of interest has changed, wherein the updated monitored result is received in a Re-Authorization Request, RAR, message with Specific Action set to PRA and PRA Status set to the updated monitored result, and sent in a Monitoring Indication message having PRA Status set to the updated monitored result; and
   sending the at least one monitored result to the requesting server.

2. The method according to claim 1, further comprising:
   determining via which one of the HSS and the PCRF entity the at least one monitored result is to be obtained, according to an operator policy.

3. The method according to claim 1, wherein obtaining the at least one monitored result via the HSS comprises:
   sending to the HSS a second request for initiating PRA functionality for the at least one UE; and
   receiving a first monitored result from the HSS.

4. The method according to claim 3, wherein obtaining the at least one monitored result via the HSS further comprises:
   receiving an updated monitored result from the mobility management node when the presence status of the at least one UE relative to the at least one area of interest has changed.

5. The method according to claim 4, wherein the first request is a Monitoring Request message having Monitoring Type set to PRA and PRA Info set to first information about the at least one area of interest;
   wherein the second request is a Monitoring Request message having Monitoring Type set to PRA and PRA Info set to second information about the at least one area of interest;
   wherein the first monitored result is received and sent in a Monitoring Response message having PRA Status set to the first monitored result; and
   wherein the updated monitored result is received and sent in a Monitoring Indication message having PRA Status set to the updated monitored result.

6. The method according to claim 5, wherein the first information indicates the at least one area of interest in a same or different manner than the second information.

7. The method according to claim 1, wherein an amount of the at least one UE is one;
   wherein the first request is a Monitoring Request message having Monitoring Type set to PRA and PRA Info set to first information about the at least one area of interest;
   wherein the third request is an Authentication Authorization Request, AAR, message with Specific Action set to PRA and PRA Info set to third information about the at least one area of interest;
   wherein the first monitored result is received in a Re-Authorization Request, RAR, message with Specific Action set to PRA and PRA Status set to the first monitored result, and sent in a Monitoring Indication message having PRA Status set to the first monitored result.

8. The method according to claim 7, wherein the first information indicates the at least one area of interest in a same or different manner than the third information.

9. The method according to claim 1, wherein an amount of the at least one UE is more than one;
   wherein the first request is a Monitoring Request message having Monitoring Type set to PRA, PRA Info set to first information about the at least one area of interest, as well as External Group Identifier and Group Reporting Guard Time for the more than one UEs;
   wherein the third request is a Monitoring Request message having Monitoring Type set to PRA, PRA Info set to third information about the at least one area of interest, as well as External Group Identifier for the more than one UEs;
   wherein the first monitored result is received and sent in a Monitoring Indication message having PRA Status set to the first monitored result; and
   wherein the updated monitored result is received and sent in a Monitoring Indication message having PRA Status set to the updated monitored result.

10. A method implemented at a requesting server, the method comprising:
   sending to a service capability exposure function, SCEF, entity a first request for initiating presence reporting area, PRA, functionality for at least one user equipment, UE, wherein the PRA functionality is used to monitor whether the at least one UE is located in at least one area of interest; and
   receiving at least one monitored result for the at least one UE from the SCEF entity, wherein receiving the at least one monitored result comprises:
      receiving an updated monitored result from the SCEF entity when the presence status of the at least one UE relative to the at least one area of interest has changed, wherein the updated monitored result is received in a Re-Authorization Request, RAR, message with Specific Action set to PRA and PRA Status set to the updated monitored result, and sent in a Monitoring Indication message having PRA Status set to the updated monitored result.

11. The method according to claim 10, wherein receiving the at least one monitored result comprises:
   receiving a first monitored result from the SCEF entity in response to the sending of the first request.

12. The method according to claim 10, wherein the first request is a Monitoring Request message having Monitoring Type set to PRA and PRA Info set to first information about the at least one area of interest;
   wherein the first monitored result is received in a Monitoring Response or Monitoring Indication message having PRA Status set to the first monitored result; and
   wherein the updated monitored result is received in a Monitoring Indication message having PRA Status set to the updated monitored result.

13. A service capability exposure function, SCEF, entity comprising:

a processor; and a memory, the memory containing instructions executable by the processor, whereby the SCEF entity is operative to:

receive, from a requesting server, a first request for initiating presence reporting area, PRA, functionality for at least one user equipment, UE, wherein the PRA functionality is used to monitor whether the at least one UE is located in at least one area of interest;

obtain at least one monitored result for the at least one UE from a mobility management node via a home subscriber server, HSS, or via a policy and charging rules function, PCRF, entity, wherein the processor operative to obtain the at least one monitored result comprises a processor operative to:

send to the PCRF entity a third request for initiating PRA functionality for the at least one UE;

receive a first monitored result from the PCRF; and receive an updated monitored result from the PCRF entity when the presence status of the at least one UE relative to the at least one area of interest has changed, wherein the updated monitored result is received in a Re-Authorization Request, RAR, message with Specific Action set to PRA and PRA Status set to the updated monitored result, and sent in a Monitoring Indication message having PRA Status set to the updated monitored result; and send the at least one monitored result to the requesting server.

14. A requesting server comprising:

a processor; and a memory, the memory containing instructions executable by the processor, whereby the requesting server is operative to:

send to a service capability exposure function, SCEF, entity a first request for initiating presence reporting area, PRA, functionality for at least one user equipment, UE, wherein the PRA functionality is used to monitor whether the at least one UE is located in at least one area of interest; and receive at least one monitored result for the at least one UE from the SCEF entity, wherein the processor operative to receive the at least one monitored result comprises a processor operative to:

receive an updated monitored result from the SCEF entity when the presence status of the at least one UE relative to the at least one area of interest has changed, wherein the updated monitored result is received in a Re-Authorization Request, RAR, message with Specific Action set to PRA and PRA Status set to the updated monitored result, and sent in a Monitoring Indication message having PRA Status set to the updated monitored result.

* * * * *

UNITED STATES PATENT AND TRADEMARK OFFICE
CERTIFICATE OF CORRECTION

PATENT NO. : 11,323,841 B2
APPLICATION NO. : 16/962702
DATED : May 3, 2022
INVENTOR(S) : Qu et al.

It is certified that error appears in the above-identified patent and that said Letters Patent is hereby corrected as shown below:

On the Title Page

On Page 2, in Item (56), under "OTHER PUBLICATIONS", in Column 2, Line 10, delete "Monte" and insert -- MONTE --, therefor.

On Page 2, in Item (56), under "OTHER PUBLICATIONS", in Column 2, Line 13, delete "Sa" and insert -- SA --, therefor.

In the Specification

In Column 1, Lines 47-48, delete "number (IMSI)-" and insert -- (IMSI) number- --, therefor.

In Column 2, Lines 54-55, delete "Authentication Authorization Request (AAR)" and insert -- Authorization Authentication Request (AAR) --, therefor.

In Column 14, Lines 30-31, delete "Authentication Authorization Request (AAR)" and insert -- Authorization Authentication Request (AAR) --, therefor.

In the Claims

In Column 22, Lines 1-2, in Claim 7, delete "Authentication Authorization Request, AAR," and insert -- Authorization Authentication Request, AAR, --, therefor.

Signed and Sealed this
Ninth Day of April, 2024

Katherine Kelly Vidal
*Director of the United States Patent and Trademark Office*